United States Patent Office 2,984,209
Patented May 16, 1961

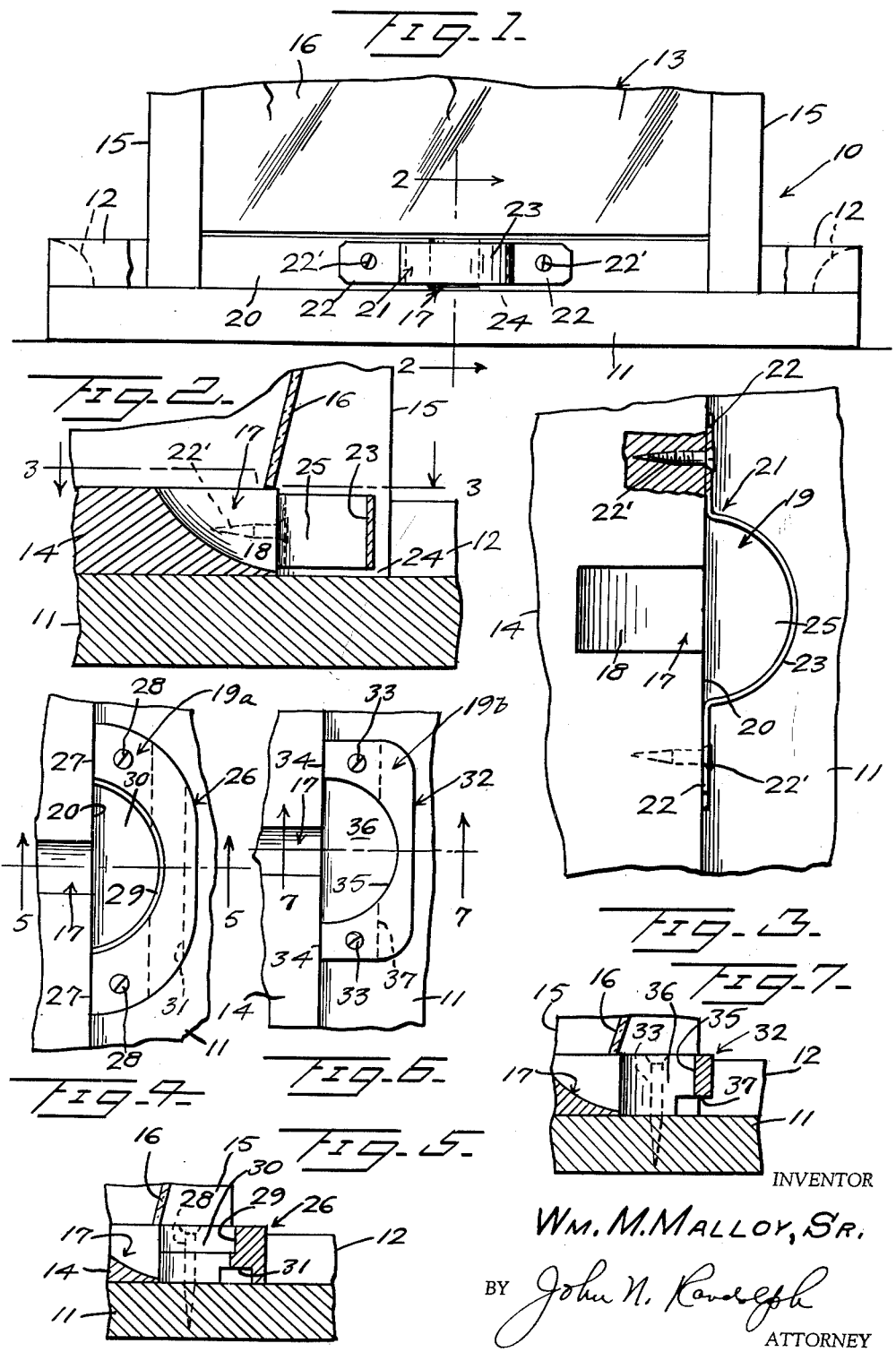

2,984,209

FEED CONTROL FOR A BIRD FEEDER

William M. Malloy, Sr., Stony Point, N.Y.

Filed Nov. 12, 1959, Ser. No. 852,540

5 Claims. (Cl. 119—52)

This invention relates to a novel control for restricting the amount of feed which can be automatically dispensed from a feeder for wild birds.

More particularly, it is a primary object of the present invention to provide means for minimizing wastage in feed supplied automatically to wild birds from a bird feeder. Wild birds will habitually scatter and waste feed which is dispensed automatically from the hopper of a bird feeder so that all of the feed from a filled hopper may be emptied within an hour or less. Such wastage makes the maintenance of wild bird feeders expensive and discourages their use by those who would otherwise feed wild birds. Accordingly, it is a primary object of the present invention to provide means whereby the feed which is automatically dispensed from the hopper of a wild bird feeder cannot be scattered and can only be acquired by the wild birds by being picked up through the open top of the feed containing receptacle into which the feed is supplied automatically by gravity.

Another object of the present invention is to provide drainage means for carrying off moisture, resulting from precipitation or other causes, from such feed receptacle, to minimize wastage of feed due to spoilage.

Various other objects and advantages of the invention will hereinafter become more fully apparent from the following description of the drawing, illustrating presently preferred embodiments thereof, and wherein:

Figure 1 is a fragmentary side elevational view, partly broken away, showing a side of the lower portion of a wild bird feeder equipped with one form of the feed control;

Figure 2 is an enlarged fragmentary transverse sectional view, taken substantially along a plane as indicated by the line 2—2 of Figure 1;

Figure 3 is a fragmentary horizontal sectional view thereof, taken approximately along the line 3—3 of Figure 2;

Figure 4 is a fragmentary plan view, similar to Figure 3, illustrating another form of the feed control;

Figure 5 is a cross sectional view thereof, taken substantially along a plane as indicated by the line 5—5 of Figure 4;

Figure 6 is a view similar to Figure 4, illustrating a third form of the feed control, and Figure 7 is a cross sectional view thereof, taken substantially along a plane as indicated by the line 7—7 of Figure 6.

Referring more specifically to the drawing, Figure 1 illustrates the lower portion of a wild bird feeder, designated generally 10, including a platform 11 having an upstanding molding 12 around the marginal portions thereof. The lower portion of the hopper 13 of the feeder 10 is shown in Figure 1 including a hopper bottom 14 which is disposed on and secured to the central portion of the upper surface of the platform 11. The hopper 13 includes end walls 15 which are disposed against the ends of the bottom 14 and which may be secured in any conventional manner to the platform 11 so as to extend upwardly therefrom. The lower portion of one of the two transparent side walls 16 of the hopper 13 is shown in Figures 1 and 2 resting upon the bottom 14 and disposed between the end walls 15. The platform 11 and the portion of the hopper 13, not shown, may correspond with the platform and hopper, respectively, in my co-pending application entitled Bird Feeder, Serial No. 740,745, filed June 9, 1958, now U.S. Patent No. 2,944,-516, issued July 12, 1960. Likewise, the bird feeder 10 may be supported in a position for use in the same manner as fully disclosed in said prior application.

The present invention relates to a novel means for effectively controlling the automatic discharge of feed from the hopper 13 to prevent the feed being scattered and thus wasted by the birds and also to minimize wastage of feed due to spoilage. The hopper bottom 14 is shown provided with a recess or groove forming a chute 17, the bottom 18 of which is preferably concavely bowed longitudinally and inclined downwardly and outwardly with respect to an adjacent edge of said hopper bottom 14. The inner end of the chute 17 opens upwardly into the hopper 13 and the lower end thereof discharges outwardly of a side edge of the bottom 14 onto a portion of the upper surface of the platform 11.

The feed control as illustrated in Figures 1 to 3 and designated generally 19 includes in addition to the chute 17 and the portion of the side edge 20 of the bottom 14, through which said chute opens, and the part of the platform 11 onto which the chute opens, a feed restraining wall member, designated generally 21. Said member 21 comprises a substantially rigid strip having substantially coplanar corresponding end portions 22 and an arcuate intermediate portion 23, which preferably comprises substantially a semicircle. The strip constituting the member 21 may be formed of metal, plastic or other suitable materials. The coplanar end portions 22 are secured against the edge 20, on opposite sides of the chute 17, by fastening elements 22' which extend therethrough and are anchored in the hopper bottom 14, so that the arcuate intermediate portion 23 is bowed outwardly relative to the chute 17. The width of the member 21 is slightly less than the thickness of the bottom 14, so that the upper edge thereof will not be disposed above the level of the upper surface of the bottom 14 and the bottom edge thereof will be disposed slightly above the level of the underside of the bottom 14 and thus slightly above and spaced from the portion of the upper surface of the platform 11, over which said arcuate wall portion 23 is disposed, to provide a drainage passage 24, as seen in Figures 1 and 2, between the bottom edge of the arcuate wall portion 23 and the platform 11. The arcuate wall portion 23 combines with parts of the edge 20 and a part of the platform 11 to form a well or trough 25 into which the chute 17 discharges.

It will be readily apparent that when the hopper 13 is filled or partially filled with bird feed, not shown, that the feed will flow by gravity through the chute 17 into the well 25 and that the feed within said well will regulate the flow of feed thereto, so that feed will be maintained in the well 25, so long as there is feed within the hopper above the chute 17. The arcuate wall portion 23 will prevent the feed flowing sufficiently from the chute to overflow the well, in a conventional manner. It will be readily apparent that wild birds may obtain feed through the open top of the well 25 but will be prevented by the restraining wall 23 from scattering the feed. It will also be understood that any moisture which may collect in the well 25, due to precipitation or other causes, will drain from said well through the passage 24 and will thus be prevented from seeping up through the chute 17 into the hopper 13 to cause spoilage of the feed within the hopper. The platform 11 may be provided with drainage means as disclosed in my co-pending application, heretofore mentioned. The passage 24 is of a size to permit moisture to readily escape from the well 25 but to prevent the escape of feed therethrough from the well.

Figures 4 and 5 illustrate another form of the feed control, designated generally 19a, and which differs from the feed control 19 only in that an arcuate restraining wall member 26 is substituted for the restraining wall member 21. Said member 26 has coplanar ends 27 which are disposed against the edge 20 of the bottom 14 on opposite sides of the chute 17. The member 26 rests upon the platform 11 and is secured thereto by fastenings 28 which extend downwardly through end portions thereof and are anchored in the platform 11. The restraining wall member 26 has an arcuate concavely bowed inner edge 29 which is disposed around and spaced outwardly from the discharge end of the chute 17 and which combines with portions of the edge 20 and a part of the upper surface of the platform 11 to form a well 30 to receive feed discharged from the chute 17, in the same manner and for the same purpose as the well 25. The underside of the member 26 is provided with a recess forming a passage 31 having ends which open outwardly of end portions of the member 26, and an intermediate portion which opens into the well 30, as best seen in Figure 5. The passage 31 is provided for the same purpose as the passage 24 to permit escape of moisture from the well 30.

Figures 6 and 7 illustrate a third form of the feed control, designated generally 19b, and which includes a restraining wall member 32, which is secured to the upper surface of the platform 11 by fastening elements 33, in substantially the same manner as the restraining wall member 26, and which has coplanar ends 34 which abut the edge 20 on opposite sides of the chute 17. The member 32 has a concavely bowed inner edge 35 disposed around the discharge end of the chute 17 and which combines with parts of the edge 20 and a part of the platform 11 to form a feed containing well 36, into which the chute 17 discharges, and which functions in the same manner and for the same purpose as the wells 25 and 30. The underside of the outer edge of the member 32 is undercut from end-to-end thereof to provide an outwardly opening drainage passage 37, as best seen in Figure 7, which opens outwardly of said member 32 onto the platform 11 and the inner edge of the intermediate portion of which opens into the well 36. The passage 37 is likewise provided for the escape of moisture from the well.

The restraining wall members 26 and 32 may be formed of wood or other suitable materials.

It will be understood that each side edge of the hopper bottom 14 may be provided with a restraining wall member with a chute 17 opening into the well formed thereby. It will also be apparent that the bird feeders may be made in various sizes and for larger bird feeders having larger hoppers, two or more chutes 17 may be provided in each side of the hopper bottom and with a restraining wall associated with each chute.

Various other modifications and changes are contemplated and may be resorted to, without departing from the function or scope of the invention as hereinafter defined by the appended claims.

I claim as my invention:

1. In combination with a bird feeder including a hopper having a bottom and a bottom edge, a platform secured to said bottom and having a portion extending outwardly from the underside of said edge of the bottom, said hopper bottom being of substantial thickness whereby the upper surface thereof is disposed substantially above the level of the upper surface of the platform, said hopper bottom being recessed to provide an automatic feed dispensing chute having an upper end opening into the hopper and a lower discharge end opening outwardly of said edge of the hopper bottom onto a portion of the platform; a feed control comprising a restraining wall having longitudinally spaced end portions disposed against said edge of the hopper bottom on opposite sides of said discharge end of the chute, said restraining wall being substantially vertical and including an intermediate portion outwardly offset from said edge of the hopper bottom and the discharge end of the chute and combining with said portion of the platform to form a feed containing well into which said chute discharges, said feed containing well having an open top, and said intermediate portion of the restraining wall including a bottom edge portion spaced from and cooperating with a part of the upper surface of the platform to constitute a drainage passage for the escape of moisture from said well and away from the chute.

2. A feed control as in claim 1, said restraining wall comprising an elongated rigid strip having coplanar end portions constituting said longitudinally spaced portions, fastening means extending through said end portions and anchored in the hopper bottom for supporting the restraining wall on the hopper bottom, and said strip having an outwardly bowed intermediate portion constituting said intermediate portion of the restraining wall and having a bottom edge spaced slightly from the upper surface of the platform to provide said drainage passage.

3. A feed control as in claim 1, said restraining wall comprising an elongated block having a side edge provided with a recess constituting said outwardly offset intermediate portion, said edge having coplanar end portions constituting said longitudinally spaced portions, fastening means extending downwardly through the end portions of the block and anchored in the platform for securing the restraining wall to the platform, said block having an underside engaging on said platform and provided with a recess opening outwardly of said block and including a part opening into the recessed edge of the block and forming a passage constituting said drainage passage.

4. A feed control as in claim 3, said block constituting a substantially arcuate strip having a concavely bowed inner edge constituting said recessed edge of the block, said passage of the block extending substantially parallel to the coplanar end portions of said recessed edge and having open ends.

5. A feed control as in claim 1, said restraining wall comprising an elongated block having a side edge provided with a recess constituting said outwardly offset intermediate portion, said edge having coplanar end portions constituting said longitudinally spaced portions, fastening means extending downwardly through the end portions of the block and anchored in the platform for securing the restraining wall to the platform, said block having an underside engaging on said platform and provided with a recess opening outwardly of said block and including a part opening into the recessed edge of the block and forming a passage constituting said drainage means, said recess in the underside of the block opening outwardly of the ends of the block and of the other longitudinal side edge thereof.

References Cited in the file of this patent

UNITED STATES PATENTS

| | | |
|---|---|---|
| 232,124 | Hatfield | Sept. 14, 1880 |
| 1,023,352 | Anderson et al. | Apr. 16, 1912 |
| 1,378,533 | FitzGerald | May 17, 1921 |
| 1,576,288 | Law | Mar. 9, 1926 |
| 2,344,367 | Pueschel | Mar. 14, 1944 |
| 2,475,207 | Smith | July 5, 1949 |
| 2,944,516 | Malloy | July 21, 1960 |